(12) United States Patent
Graves

(10) Patent No.: US 11,970,105 B2
(45) Date of Patent: Apr. 30, 2024

(54) RATCHET WINCH INSERT DEVICE

(71) Applicant: Jomoko Tamboura Graves, Toledo, OH (US)

(72) Inventor: Jomoko Tamboura Graves, Toledo, OH (US)

(73) Assignee: Jomoko Graves, Toledo, OH (US)

( * ) Notice: Subject to any disclaimer, the term of this patent is extended or adjusted under 35 U.S.C. 154(b) by 252 days.

(21) Appl. No.: 17/350,284

(22) Filed: Jun. 17, 2021

(65) Prior Publication Data

US 2022/0126745 A1 Apr. 28, 2022

Related U.S. Application Data

(60) Provisional application No. 63/204,800, filed on Oct. 27, 2020.

(51) Int. Cl.
*B60P 7/00* (2006.01)
*B60P 7/08* (2006.01)

(52) U.S. Cl.
CPC ............ *B60P 7/083* (2013.01); *B60P 7/0846* (2013.01)

(58) Field of Classification Search
CPC ....... B60P 7/083; B60P 7/0846; B60P 7/0853; B66D 1/04; B66D 1/16; B66D 1/48
See application file for complete search history.

(56) References Cited

U.S. PATENT DOCUMENTS

| | | | | |
|---|---|---|---|---|
| 4,234,166 A | * | 11/1980 | Cederblad | F16G 3/006 |
| | | | | 242/396.2 |
| 5,156,506 A | * | 10/1992 | Bailey | B61D 45/003 |
| | | | | 410/100 |
| 6,494,435 B1 | * | 12/2002 | Cauchon | B66D 1/50 |
| | | | | 254/364 |
| 6,558,092 B1 | * | 5/2003 | Woodruff | B61D 45/001 |
| | | | | 410/23 |
| 7,410,334 B2 | * | 8/2008 | McGrew | B60P 7/0853 |
| | | | | 410/100 |
| 7,413,170 B2 | * | 8/2008 | Ruan | B60P 7/083 |
| | | | | 254/223 |
| 7,472,890 B2 | * | 1/2009 | Huang | B65B 13/18 |
| | | | | 24/69 ST |

(Continued)

FOREIGN PATENT DOCUMENTS

JP 2006517502 A * 7/2006 ............ B60P 7/0846

*Primary Examiner* — Emmanuel M Marcelo

(57) ABSTRACT

A universal device adapted to fit or be inserted within the cavity of a one directional ratchet gear to tighten tie-down straps utilized to secure cargo transported on car haulers, flatbed trailers or the like. The device includes but not limited to an elongated cylinder shape adaptor insert or hub with the ability to lock in place and having a standard, customized or dog ratchet mechanism fixed at one end thereof. A cylindrical bar socket and ratchet gear pulley extends from one side of the ratchet mechanism. The cylindrical bar socket is designed to encompass a standard, customized or dog ratchet drive shaft or opposite the elongated cylinder shape insert may encompass the aforementioned. The device herein permits the marrying of old or existing one-way ratchet gear assembly and shaft to new two-way directional or freewheel and drive without dismantling the old ratchet gear assembly; allowing old and new to rotate as one single unit.

1 Claim, 6 Drawing Sheets

(56) References Cited

U.S. PATENT DOCUMENTS

| | | | |
|---|---|---|---|
| 7,618,021 B2* | 11/2009 | Leone | B60P 7/083 |
| | | | 254/238 |
| 8,336,861 B2* | 12/2012 | Chou | B66D 1/04 |
| | | | 254/365 |
| 9,010,732 B2* | 4/2015 | Zhu | B60P 7/0853 |
| | | | 24/69 ST |
| 10,443,634 B2* | 10/2019 | Spychalski-Merle | B60P 7/083 |
| 2002/0195594 A1* | 12/2002 | Cauchon | B66D 1/50 |
| | | | 254/243 |
| 2004/0037664 A1* | 2/2004 | Woodruff | B61D 45/001 |
| | | | 410/12 |
| 2004/0155230 A1* | 8/2004 | Fortin | B60P 7/083 |
| | | | 254/222 |
| 2007/0114504 A1* | 5/2007 | Ruan | B60P 7/083 |
| | | | 254/223 |
| 2007/0221897 A1* | 9/2007 | Cardona | B60P 7/0853 |
| | | | 254/218 |
| 2009/0236458 A1* | 9/2009 | Rodrique | B60P 7/0846 |
| | | | 242/580 |
| 2011/0150595 A1* | 6/2011 | Foryan | B60P 7/083 |
| | | | 254/223 |

\* cited by examiner

RATCHET WINCH INSERT DEVICE

CROSS-REFERENCE TO RELATED APPLICATIONS

Not applicable.

STATEMENT REGARDING FEDERALLY SPONSORED RESEARCH OR DEVELOPMENT

Not Applicable.

THE NAME THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

With respect to the claimed invention: (1) no disclosure was made by the inventor or joint inventor or by another who obtained the subject matter disclosed directly or indirectly from the inventor or a joint inventor; or (2) the subject matter disclosed had not, before such disclosure, been publicly disclosed by the inventor or a joint inventor or by another who obtained the subject matter disclosed directly or indirectly from the inventor or a joint inventor.

BACKGROUND OF INVENTION

(1) Field of Invention

The invention pertains to cargo transport. More specifically, the invention pertains to a ratcheting assembly attached to auto transport carriers to hold down vehicles.

(2) Description of Related Art Including Information Disclosed Under 37 CFR 1.97 and 1.98

Ratcheting assemblies as a mechanical device have for many decades allowed continuous linear or rotary motion in only one direction all while inhibiting motion in the opposite direction. These devices are commonly used in tools and machinery and have advanced over the years to traverse over to semi trucks or freight carriers.

Ratchets or the assembly thereof generally consists of a round gear or a linear rack with teeth, a spring-loaded finger called a pawl that engages the teeth of the round gear, and a pivoting point. The teeth are uniform but are usually assematrical, with each tooth having a moderate slope on one edge and a much steeper slope on the other edge.

BRIEF SUMMARY OF CURRENT ART

The present invention relates generally to cargo transported on automobile haulers and more particularly, to a universal ratcheting winch insert device that attaches and transforms an old or existing one directional ratchet assembly into a two directional ratchet assembly for tie down of cargo. Cargo such as vehicles can be transported via a transport trailer ("car haulers"), Multiple vehicles can be transported on such a trailer.

For example when transporting vehicles, each vehicle transported typically has its own platform onto which each vehicle is placed. By law each vehicle is secured to the trailer, which often includes a tie down system to secure each vehicle to its platform on the trailer. Typical tie down systems secure a vehicle with straps arranged around each wheel of the vehicle. The vehicle is typically restrained to the platform, and therefore the trailer, by arranging the straps to the wheels of the vehicle and the platform or other part of the trailer.

DETAILED DESCRIPTION OF THE INVENTION

Figure 1:
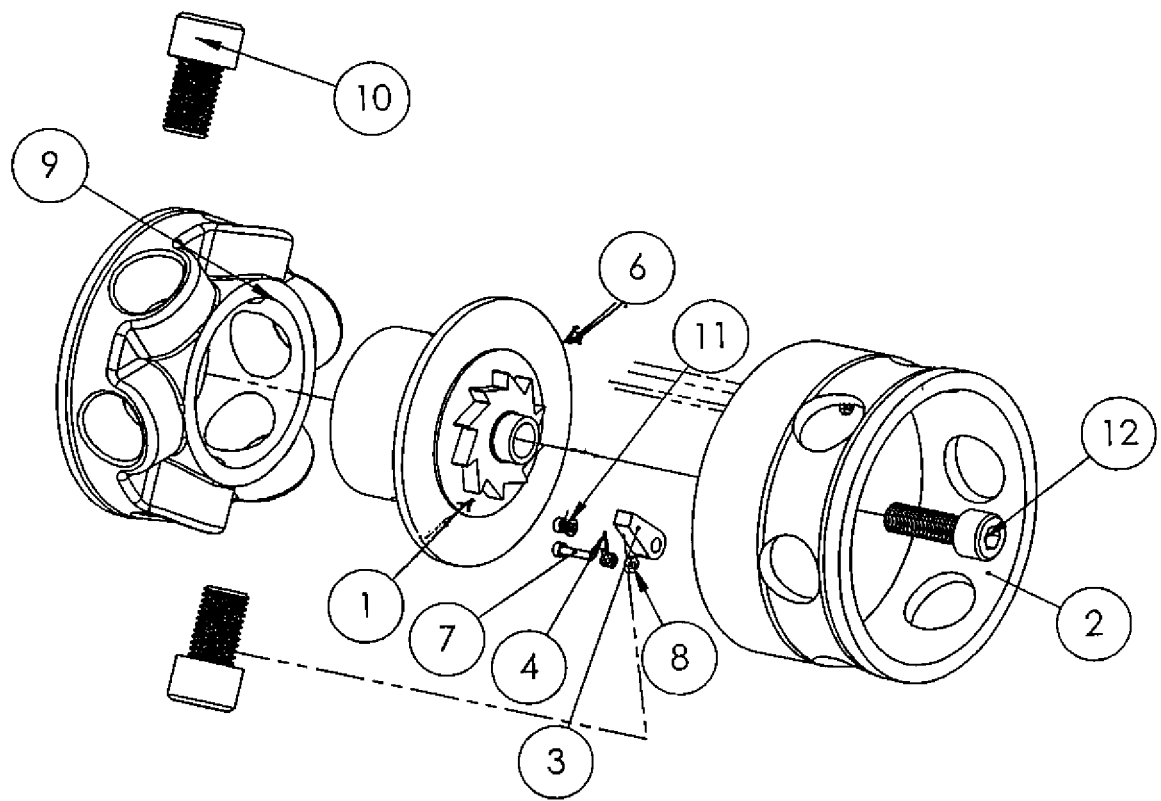
FIG. 1 illustrates embodiment of an exploded three dimensional perspective view of ratchet winch insert device assembled with (1) ratchet gear, (2) cylindrical bar socket and ratchet gear pulley, (3) pawl, (4) pawl spring, (6) cylindrical adaptor insert or hub, (7) pawl pivot shaft, (8) pawl pivot shaft screw, (9) existing one way ratchet gear, (10) locking adaptor screw, (11) bolt and washer, (12) cylindrical bar socket attachment screw.
Figure 2:
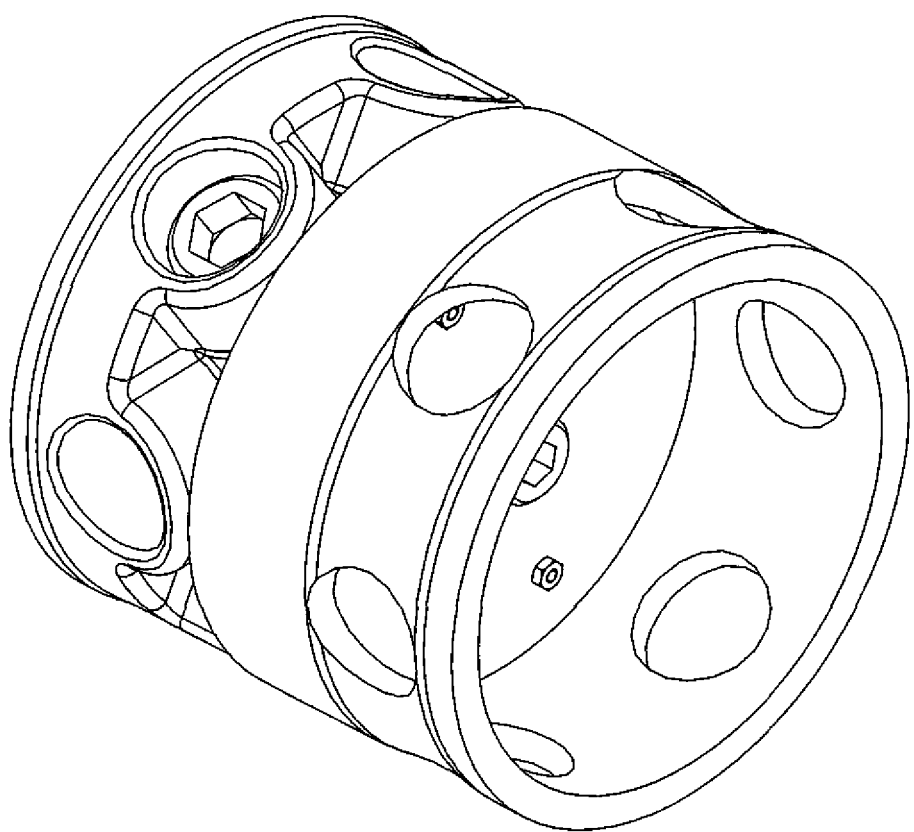
FIG. 2 illustrates three dimensional view of ratchet winch insert device assembled and locked together with old or existing one way ratchet gear.
Figure 3:
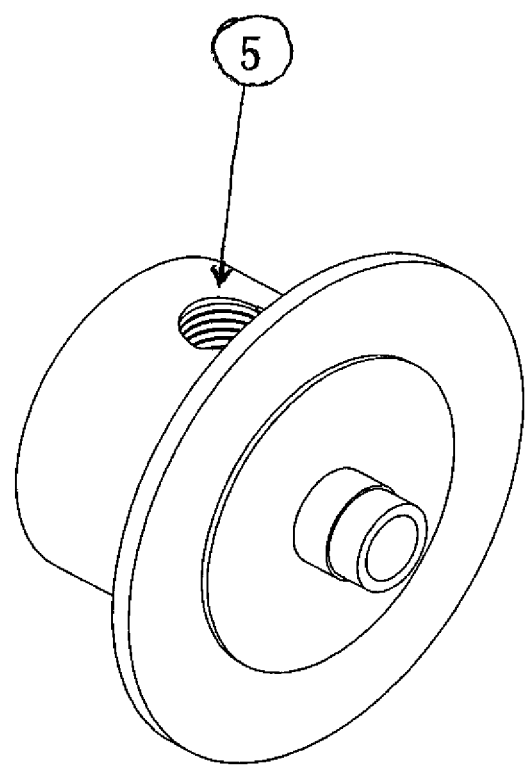
FIG. 3 illustrates three dimensional view of cylindrical adaptor insert or hub with (5) screw or attachment holes.
Figure 4:
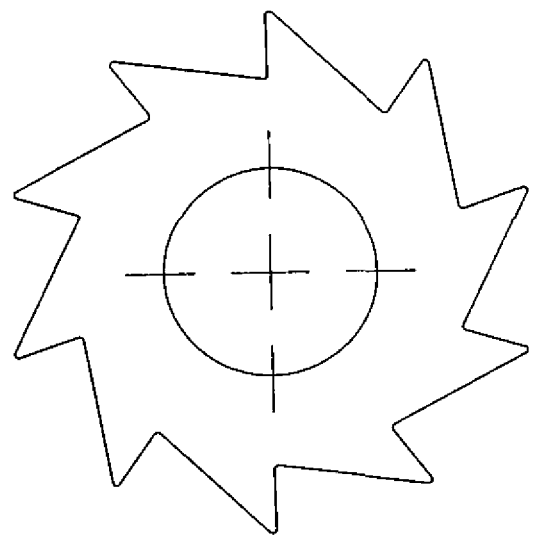
FIG. 4 illustrates two dimensional view of ratchet gear with hole located on center.
Figure 5:
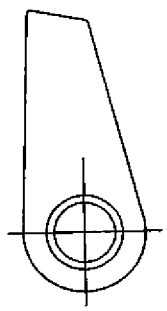
FIG. 5 illustrates two dimensional view of pawl with hole located on center.
Figure 6:
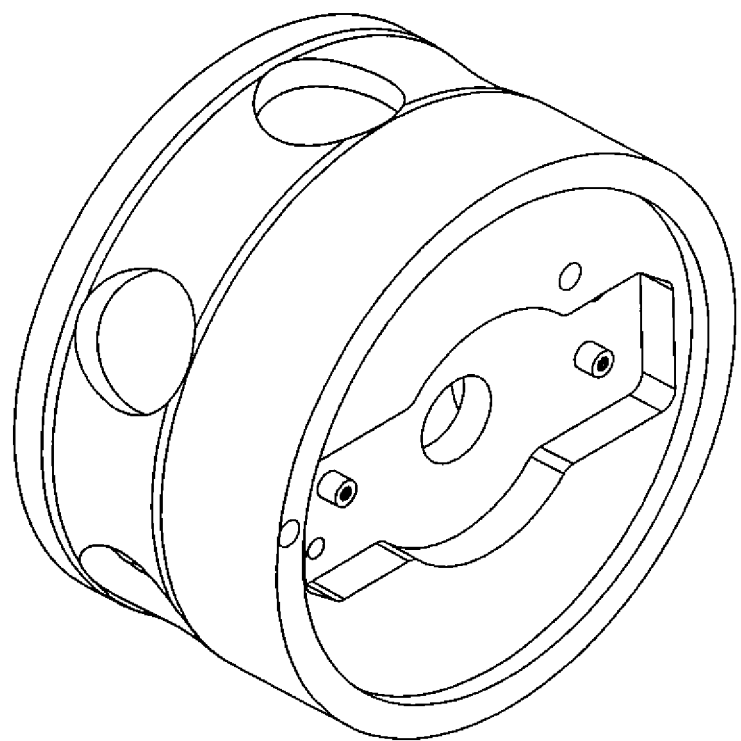
FIG. 6 illustrates three dimensional perspective view of cylindrical bar socket and ratchet gear pulley with routed out pocket for ratchet wheel and pawl assembly.

The present invention relates generally to ratchet assemblies and, more particularly, to a ratchet assembly that inserts within the cavity of a one directional ratchet gear to tighten tie-down straps utilized to secure cargo transported on car haulers, flatbed trailers or the like. The ratchet insert device is compact and universal to be attached to any existing ratchet affixed to a transport trailer or truck.

It is noteworthy that the invention herein has been described with great detail to admirable embodiments. Further, it will be understood by those skilled in the art that various changes may be necessary and equivalents may be substituted for elements thereof without departing from the scope of the invention, including the alternative embodiments mentioned above. What's more, modifications may be made to adapt a particular structure to the teachings of the invention without departing from the essential scope. Therefore, it is intended that the invention not be limited to the particular embodiments disclosed for carrying out this invention, but that the invention will include all embodiments falling within the scope of the claims. Moreover, the use of the terms hub, insert or adaptor makes note that the innovation is a standalone item and the importance of that is its used to distinguish the innovation as being used to enhance an existing inferior item without disassembling the original elements of that item.

Furthermore, the use of the terms at least one, does not denote a limitation of quantity, but rather denote the presence of at least one of the referenced items.

What is claimed is:

1. A universal ratcheting winch insert device, the device comprising:
   a stand-alone adaptor insert or hub and ratchet gear assembly that may be inserted within a cavity and fastened to an existing end of a one directional ratchet gear and tie down shaft being affixed to a transport trailer;
   and wherein the ratchet winch insert device assembly comprises:
   a ratchet gear assembly affixed to a stand-alone adaptor insert or hub;
   where said insert or hub has at least one fastener hole or attachment lock that fall in line with the existing end of a one directional ratchet gear head holes of a tie down shaft;
   the ratchet gear assembly being affixed to an underside of the stand-alone adaptor insert or hub, the ratchet gear assembly having routed out pocket with engagement teeth on an outer circumference of the ratchet gear assembly configured to receive a pawl mechanism;
   where said pawl mechanism is affixed to an underside of a cylindrical bar socket and ratchet gear pulley assembly;
   where said stand-alone adaptor insert or hub with an underside surface positioned in opposition to and in mechanical contact with the underside of the cylindrical bar socket and ratchet gear pulley assembly;
   and wherein a configured joint assemblies engage and allow the ratchet gear assembly and/or ratchet winch insert device when inserted in the existing end of the one directional ratchet gear and tie down shaft being affixed to the transport trailer the ability to act as one unit;
   where said existing ratchet gear head and ratchet winch insert device is configured to rotate in a first direction such that an existing ratchet gear head and ratchet winch insert device rotate as a single unit;
   and where said ratchet winch insert device is configured to disengage when the cylindrical bar socket and ratchet clear pulley assembly is rotated in a second direction such that the existing ratchet gear head and ratchet winch insert device rotate independently.

* * * * *